3,318,851
MALEIC ANHYDRIDE COPOLYMERS

Barry Nicholls, New Barnet, and John Brewster Rose, St. Albans, England, assignors to Imperial Chemical Industries Limited, London, England, a corporation of Great Britain
No Drawing. Filed June 19, 1963, Ser. No. 288,867
Claims priority, application Great Britain, June 25, 1962, 24,282/62
27 Claims. (Cl. 260—78.5)

The present invention relates to new copolymers and more particularly to copolymers of maleic anhydride and an alkene.

Copolymers of maleic anhydride with a wide variety of other ethylenically unsaturated monomers such as vinyl ethers, styrene and vinyl acetate are known. They are generally water sensitive and frequently soluble in water. They are used as obtained, or after modification with ammonia or amines, or in the form of sodium salts, as additives to soil, visosity depressants for lubricating oils, tanning agents, gelatin substitutes, sizes for yarn and other similar applications.

We have now found that copolymers of maleic anhydride with certain alkenes have negligible water-sensitivity and, even at high molecular weights, have melt viscosities which are sufficiently low to allow them to be moulded at temperatures at which little or no degradation occurs to give shaped products which are often transparent, colourless, of high softening point and have good physical properties and surface hardness.

According to the present invention we provide a copolymer of maleic anhydride and an alkene having the structure

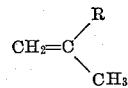

where R is a straight chain alkyl group containing from 2 to 6 carbon atoms.

Examples of alkenes that may be used are 2-methyl butene-1, 2-methyl pentene-1, 2-methyl hexene-1, 2-methyl heptene-1 and 2-methyl octene-1.

However, we prefer to use 2-methyl butene-1 and 2-methyl pentene-1 because of their ready availability and because they give copolymers which are strong, transparent, amorphous solids which are very suitable for fabrication.

The polymers are generally colourless, transparent solids and those of high molecular weight and derived from 2-methyl butene-1 and 2-methyl pentene-1 are strong and amorphous, even after annealing slowly from elevated temperatures, and are suitable for moulding, extruding or otherwise shaping into bodies having surprisingly good resistance to water, high softening points of the order of 150° C. to 170° C. or higher, good flexural strength and good surface hardness.

While these properties make our copolymers suitable for a wide variety of applications, it is sometimes desirable to modify them by adding at least one other component to the copolymer and according to a further embodiment of our invention we provide a copolymer of maleic anhydride, an alkene having the structure

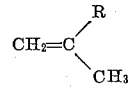

where R is a straight chain alkyl group containing from 2 to 6 carbon atoms and at least one other monoethylenically unsaturated compound and in which there is at least 25 mole percent of maleic anhydride and at least 25 mole percent of the alkene. It may be appreciated that the other monoethylenically unsaturated compound may be one of our specified alkenes which is different from that selected as the primary alkene component in the copolymer. Thus, for example, where 2-methyl butene-1 is the chosen alkene, 2-methyl pentene-1 may be used as the third component and vice versa.

Copolymers consisting solely of maleic anhydride and one of our specified alkenes contain substantially equimolar amounts of each monomer. It is thought that the chains comprise maleic anhydride units alternating with the alkene units. In general, we have found that any other monomers added to the polymerisation will tend to replace uniquely either the maleic anhydride or the alkene units of the chain although a few third monomers may replace both units.

Without attempting to theorise upon the mechanism of the polymerisation, it may be said as a rule of thumb that if the third monomer contains substituent groups which are notably electron-releasing in character (i.e. they supply electrons to the double bond), then the monomer will replace only the alkene groups, while if it contains substituent groups notably electron-attracting in character (i.e. attracting electrons away from the double bond), then it will replace only the maleic anhydride groups. It will be appreciated that where such a monomer is used as the third constituent, it can be present in an amount of not more than 25% molar in our specified copolymers.

Examples of monomers with electron-releasing groups are alkenes, aralkenes, vinyl esters and vinyl ethers and examples of monomers with electron-attracting groups are esters, anhydrides, imides and N-substituted imides of ethylenically unsaturated dicarboxylic acids.

While we prefer to use only one further monomer, so forming a tercopolymer, two or more additional monomers may be added if desired.

These monomers may, for example, be ethylene or may have any of the following structures

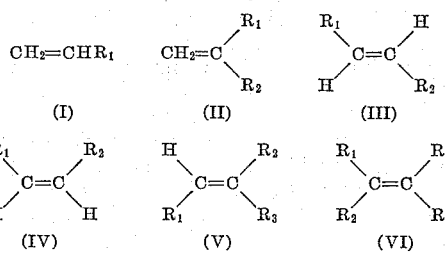

where $R_1$, $R_2$, $R_3$ and $R_4$ are each selected from the class consisting of monovalent hydrocarbon radicals such as alkyl, cycloalkyl, aryl, alkaryl and aralkyl groups, or groups having the structure —COOH, —COOR,

—O.CO.H., —O.CO.R, —OR, —CN, —SO$_2$.R

—SO$_3$.H, —CO.R, —CONH$_2$, —CONHR —CONR$_2$

—CCl, —CHO, —NO$_2$ or halogen where R is a monovalent hydrocarbon radical. On the other hand, two of $R_1$, $R_2$, $R_3$ and $R_4$ may be conjoined to form a divalent radical such as an alkylene radical to give, for example, methylene cyclohexane in the case of structure (II) or cyclopentene in the case of structure (IV). Other forms of divalent radicals are anhydride groups, for example, to give substituted maleic anhydrides, itaconic anhydride, citraconic anhydride and the like or imide groups to give, for example, maleimide and its N-substituted derivatives.

Examples of classes of monomer that may be used are alkenes such as ethylene, propylene, butene-1, pentene-1, hexene-1, heptene-1, octene-1, 2,4,4-trimethyl pentene-1, trimethyl ethylene, tran-stilbene and methylene cyclohexane; cycloalkenes such as cyclopentene and cyclohexene; aralkenes such as styrene, α-methyl styrene, α-ethyl styrene and other substituted derivatives of styrene; vinyl ethers such as methyl vinyl ether, ethyl vinyl ether, propyl vinyl ether, isopropyl vinyl ether and isobutyl vinyl ether; isopropenyl ethers such as methyl isopropenyl ether; α,β-ethylenically unsaturated carboxylic acids, their esters and nitriles such as methyl acrylate, ethyl acrylate, 2-ethyl hexyl acrylate, acrylonitrile, methyl methacrylate and methacrylonitrile; ethylenically unsaturated dicarboxylic acids, their mono- and di-esters, nitriles, anhydrides, and imides such as dimethyl maleate, diethyl maleate, dibutyl maleate, maleic anhydride, maleimide, N-methyl maleimide, N-ethyl maleimide, N-phenyl maleimide, N-p-chlorophenyl maleimide, dimethyl fumarate, diethyl fumarate, dibutyl fumarate, itaconic anhydride, monobutyl itaconate, citraconic anhydride, mesaconic anhydride and vinylidene cyanide and halogen-substituted alkenes such as vinyl chloride, vinylidene chloride, allyl chloride and methallyl chloride.

It is preferred to use monomers in which the ethylenically unsaturated carbon atoms are not too heavily substituted since ease of polymerisation generally tends to decrease with increase in the number of substituents on the ethylenically unsaturated carbon atoms. Thus, our preferred monomers fall in general into classes having the structures (I), (II), (III) and (IV) rather than (V) or (VI). However, there may be exceptions to this rule; for example, trimethyl ethylene may copolymerise more readily than butene-2 in our process.

Increase in the length of carbon chain in the monomer generally reduces its ease of polymerisation and therefore we prefer to use compounds having carbon chains not exceeding 6 carbon atoms in length.

We also prefer not to use compounds having bulky substituents on the ethylenically unsaturated carbon atoms since they tend to shield the double bond and inhibit polymerisation, particularly where two such substituents are attached to the same ethylenically unsaturated carbon atom. However, the activating effect that some bulky substituents have on the double bond tends to cancel out their adverse shielding effect. For example, 1,1-diphenyl ethylene is polymerised only with extreme difficulty, whereas vinylidene cyanide may be used with ease.

Where the additional monomer is an alkene, we prefer to use propylene or an alkene containing a chain of not more than 6 carbon atoms and having the structure (II) where $R_1$ and $R_2$ are alkyl radicals.

We prefer propylene because of its cheapness, ease of polymerisation with other monomers and ready availability. However, the addition of large amounts of propylene may affect the water sensitivity of the product to a considerable extent and the copolymers may even become slightly water-soluble. Therefore, we prefer to use only small amounts of propylene in the copolymer.

We prefer to use alkenes having a chain of not more than 6 carbon atoms and having the structure (II) where $R_1$ and $R_2$ are akyl radicals because of their ease of polymerisation with the other monomers and because their presence has little or no apparent effect on water sensitivity. They give strong, rigid copolymers having satisfactory softening points.

Another suitable alkene is trimethyl ethylene which copolymerises with the other monomers with ease to give copolymers of high softening point.

The aralkenes such as styrene and its substituted derivatives (e.g. α-methyl styrene) give copolymers having little or no water-sensitivity and very high softening point. The products are especially suitable for applications requiring good thermal stability.

The use of lower molecular weight ethers, such as the vinyl ethers of alcohols containing up to three carbon atoms, in the copolymerisation tends to give products of undesirably high water-sensitivity and we prefer to use the ethers of alcohols containing from 4 to 6 carbon atoms. Even these ethers may induce water-sensitivity in the products if they are used in large amounts and it is generally preferred, therefore, to obtain products containing only small amounts of the ether. Suitable amounts of the ether. Suitable amounts may be determind by simple experiment.

The use of certain monomers having electron-attracting groups and which will replace the maleic anhydride units in the copolymer chain may lower the softening point of the products substantially and care should be taken to use only small amounts of such compounds. As a general rule, it may be stated that the substitution of maleic anhydride units by units from such monomers having a cyclic structure will not reduce the softening point of the polymer to a large extent, or may even increase it; but their substitution by substantial quantities of acyclic monomers may reduce the softening point considerably.

Examples of the cyclic monomers are cyclic derivatives of α,O-ethylenically unsaturated dicarboxylic acids such as their anhydrides, imides and N-substituted imides. Of these itaconic anhydride and citraconic anhydride may be preferred because of their ready availability and maleimide and its N-substituted derivatives such as N-methyl maleimide and N-phenyl maleimide because they have little or no effect on the water sensitivities of the product and may even increase the softening point.

Examples of acyclic monomers are esters and nitriles of acrylic and methacrylic acids and mono- and di-esters of ethylenically unsaturated dicarboxylic acids. The nitriles of acrylic and methacrylic acids, particularly methacrylonitrile, are attractive as they have little or no effect on the water sensitivity of the polymers. Where the esters are derived from α,O-ethylenically unsaturated acids, we prefer those in which the ester groups are in the "trans" positions (i.e. having the structure III) as they are more easily polymerised. Examples are the fumarates, which have only little effect on the water-sensitivities of the products. The esters of methacrylic acid may replace both the maleic anhydride and the alkene units in the polymer chains.

We prefer not to use monomers containing chlorine bound to an aliphatic carbon atom because their tendency to degrade at elevated temperatures reduces the usefulness of the polymers so produced. Where they are used, they should be present in the polymeric products only in small quantities. Examples of such monomers are vinyl chloride, vinylidene chloride, allyl chloride and methallyl chloride.

Although the incorporation into the copolymers of maleic anhydride with our specified alkenes of many of the additional monomers causes a decrease in the melt viscosity in the products and consequently provides materials that may be more easily fabricated into shaped products, this decrease is nearly always more than offset by an undesirable increase in the water sensitivity of the materials or by an equally undesirable drop in softening point. The incorporation of other monomers causes an increase in the melt viscosity of the products and a consequent increase in the temperature at which they may be moulded. This increase in temperature is frequently sufficient to cause substantial degradation of the polymers to occur during moulding. For these reasons, we prefer in general to use the copolymers of maleic anhydride and the alkene alone.

The copolymers of our invention may be formed by polymerising the monomeric ingredients in the presence of a suitable free radical catalyst and therefore as a further embodiment of our invention we provide a process which comprises reacting maleic anhydride and an alkene of the structure:

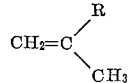

where R is a straight chain alkyl group containing from 2 to 6 carbon atoms, alone or together with at least one other copolymerisable monomer in the presence of a free radical polymerisation catalyst in bulk or in solution to give a copolymer containing at least 25% molar of maleic anhydride and at least 25% molar of the alkene, separating the copolymer from the residual liquor of the polymerisation and drying it.

Polymerisation in aqueous dispersion is not used as the maleic anhydride may be hydrolysed to maleic acid under the conditions of polymerisation. For the same reason, any bulk or solution polymerisation process is preferably also in the absence of any substantial amount of water.

Polymerisation in bulk is generally unsatisfactory below 50° C. because the maleic anhydride is in the solid state while at temperatures where the maleic anhydride is molten, the polymeric products are soluble to some extent in the maleic anhydride and are consequently difficult to separate and purify. Also, where a volatile or gaseous third component is added to the monomer mixture for polymerisation in bulk, the use of relatively high pressures may be required. Therefore we prefer to effect the polymerisation in a solvent. Solution polymerisation may be effected in any suitable solvent such as a straight chain or cyclic saturated hydrocarbon, an aromatic hydrocarbon, a chlorinated hydrocarbon, an ether, e.g. dioxane. Suitable solvents include n-hexane, cyclohexane, heptane, octane, benzene, toluene, xylene, ethylene dichloride and the like. In some cases, a third monomer (for example, styrene) which is a solvent for the other two, may be added to the polymerisation mixture in which case polymerisation of the bulk casting type (e.g. to make sheet) may be effected. Certain solvents such as the chlorinated alkanes (e.g. methylene dichloride or chloroform), or diethyl ether or toluene may act as strong chain transfer agents and give polymers of rather low molecular weight and low softening point so solvents which show little or no chain transfer activity are preferred. Examples are the straight chain alkanes and benzene. It is often useful to operate the process with solvents having low or moderate chain transfer activity when it is desired to control the molecular weight of the product. A suitable solvent for this purpose is toluene.

The polymerisation is effected in the presence of any suitable free radical catalyst, the more common examples of which are organic compounds containing peroxide or azo groups. Examples are benzoyl peroxide, acetyl peroxide, butyryl peroxide, lauroyl peroxide, succinoyl peroxide, acetyl cyclohexyl sulphonyl peroxide, ascaridole, peresters such as t-butyl perbenzoate and azo compounds such as $\alpha\alpha'$-azodi-iso-butyronitrile. The choice of catalyst will depend mainly upon the temperature of polymerisation. The amount of catalyst used normally ranges from about 0.05% to about 5.0%, based on the weight of monomers, although larger or smaller amounts may be used if desired. However, the use of large amounts of catalyst generally results in the production of polymers of low molecular weight and, consequently, low softening point and is preferably avoided.

The choice of temperature for the polymerisation depends to a certain extent upon the molecular weight required in the product, the lower temperature in general giving rise to the higher molecular weight product (all other things being equal). Since a drop in molecular weight may lower the softening point of the polymer and affect its physical properties adversely, it is apparent that the choice of the temperature of polymerisation may affect the softening point of the product. We have found that in general strong, rigid polymers having satisfactory softening points are consistently obtained using polymerisation temperatures of from about 25° C. to about 120° C. although temperatures of from —80° C. to +150° C. may be effective.

Since certain monomers used as third components, such as propylene for example, may act to some extent as chain transfer agents, the choice of the conditions of the polymerisation, such as the solvent (if used), the temperature and catalyst concentration, will depend upon the amount of that monomer present in the polymerisation if products of suitable molecular weight and softening point are to be obtained.

The polymerisation may be effected at atmospheric pressure, at sub-atmospheric pressure or at super-atmospheric pressures if desired.

In a typical polymerisation, the monomeric materials are charged into a vessel containing a solvent, the mixture brought to the desired temperature and the polymerisation initiated by the addition of the free-radical catalyst. The polymerisation is preferably effected in the absence of oxygen, which if present in appreciable quantities may inhibit the reaction. Oxygen may be readily excluded from the reaction by polymerising under an atmosphere of dry nitrogen or by evacuating the polymerisation vessel before charging the reactants.

On completion of the polymerisation reaction, the separation of the copolymer from the polymerisation liquor may be effected in any suitable manner, such as by boiling off the unreacted monomers and solvent, if any, or by filtration or centrifuging.

Where the polymerisation is effected in the presence of large excesses of the alkene or is carried to completion in the absence of excess of the alkene, there is generally little or no residual maleic anhydride. However, it is often uneconomical to use larger excesses of the alkene because of the expense of recovering the residue from the polymerisation, and to carry the polymerisation to completion may require an excessively long time. Thus, the mass at the end of the polymerisation frequently contains residual maleic anhydride which is difficult to remove completely by normal separation methods such as those outlined above because it is a solid at room temperature and a solvent for the copolymer when molten. In addition, the polymerisation medium may contain non-polymeric reaction products of the maleic anhydride with other ingredients of the polymerisation and these by-products may also be difficult to remove from the polymer by such separation methods.

If the copolymers are to be extruded or subjected to other fabrication processes which require the use of elevated temperatures, it has been found necessary to exclude from them substantially all traces of unreacted maleic anhydride and non-polymeric reaction products of maleic anhydride as the presence of these compounds may be the cause of opacity and bad colour in the copolymers and may increase their water sensitivity. It may also cause foaming during fabrication and although this may be used e.g. in the production of a rigid plastic foam, it is generally undesirable.

The maleic anhydride together with its non-polymeric reaction by-products may be removed suitably by washing the polymer after it has been separated from the residual liquor of the polymerisation and in a preferred process according to our invention the polymeric product is washed to remove these materials after it has been separated from the polymerisation liquor.

Any organic liquid which is a solvent for maleic anhydride but not for the copolymer may be used for washing the copolymer and examples include aliphatic and aromatic hydrocarbons such as hexane, heptane, octane, benzene, toluene and xylene; chlorinated hydrocarbons such as ethylene dichloride; alcohols (such as methanol and ethanol) and ethers. The wash may be effected conveniently with warm or hot solvent.

In general, however, we prefer not to use solvents which may react with the anhydride groups of the copolymer under the washing conditions since their use may cause a reduction in the softening points of the copolymers and may affect the water sensitivity of the products adversely.

Such solvents include, for example, alcohols and primary and secondary amines.

We prefer to use an ether such as diethyl ether as the wash liquid since its use generally gives polymers of good colour. Alternatively, aromatic hydrocarbons such as benzene may be used as they tend to swell the polymer and may effectively remove substantially all traces of non-polymeric products.

We further prefer that the polymer is washed in a finely divided state in order to ensure as thorough a removal of the maleic anhydride as possible.

After separation of the polymer from the polymerisation liquor (and after washing if this preferred step is used) it is necessary to dry the copolymer as the presence of any residual liquor or wash liquid may cause it to foam or degrade during fabrication at elevated temperatures and may also affect the physical properties such as the strength of the copolymer. In addition, where certain compounds such as benzene have been used as the wash liquid, their presence in the copolymer will cause it to be rejected for many uses on toxicity grounds.

The copolymer may be dried by subjecting it to elevated temperatures, preferably in a stream of air or inert gas or by holding it under a vacuum. Where it is proposed to dry it at elevated temperatures care should be taken to ensure that it is not subjected to temperatures above its softening point for any length of time because agglomeration may occur and the agglomerated particles may occlude volatile material which then becomes very difficult to remove. We have found, however, that the copolymers may be subjected to temperatures just above their softening points for short periods of time, for example up to about ten minutes, without any adverse effects. A satisfactory alternative method of drying the polymer is to pre-dry it until most of the liquid is removed and then to extrude it in a vacuum extruder. This is a convenient method where it is desired to compact the polymer before subjecting it to further processing. Merely holding the polymer at a moderately elevated temperature for a few hours in still air, such as in an oven for example, may be insufficient to effect thorough drying and the products dried by this method may form bubbles or foam during compression moulding or extrusion.

In order to obviate the possibility of oxidising the polymer during the drying operation, we prefer to effect it in an inert atmosphere.

We prefer to effect the drying step at an elevated temperature below the softening point of the polymer and in vacuo and the copolymer is preferably in a finely divided state.

Where the product is to be extruded in an extruder without vacuum, rigorous drying should be used, preferably under high vacuum using absolute pressures of the order of 0.5 mm. of mercury or less. Alternatively, where less rigorous vacuum conditions are used, very long drying periods will normally be required, e.g. of the order of 100 hours or more.

The polymeric products are generally obtained in the form of a fine dry powder having a packing density of about 0.1–0.2 gm./cc. and substantially free from material that would be volatile at the temperatures of fabrication processes such as moulding or extrusion. It may be difficult to handle or transport owing to the formation of electrostatic charges upn the surfaces of the powder particles. It is therefore preferred to compact the powder before using it in a shaping operation. This may be done in a convenient manner by forming pellets of the product by placing the powder in a container and exerting pressure upon it, optionally with the aid of heat. Alternatively, the powder may be extruded and the extrudate cut into pellets. A vacuum extruder may be used at this stage, as described above, if desired.

The powder may be compounded with other ingredients such as stabilisers (e.g. antioxidants and U.V. stabilisers), lubricants, mould-release agents and the like at this stage, e.g. by using an extruder with a mixing head.

Our preferred copolymers are those of maleic anhydride with 2-methyl butene-1 and of maleic anhydride and 2-methyl pentene-1.

The copolymers of maleic anhydride and 2-methyl-butene-1 are transparent, generally colourless materials having melt viscosities of the order of 60–200 kilopoises as measured at a constant shear stress of $10^7$ dynes/sq. cm. at 250° C. Thus, they may be moulded at temperatures as low as 220° C. (with consequently little or no degradation) to give shaped products having excellent resistance to water. (Immersion of a 1 gm. sample having a thickness of 0.050±0.005 inch in boiling water for 120 minutes gives only a 0.4% increase in weight.) The materials are shown by X-ray analysis to be amorphous as formed. Annealing these polymers from 230° C. at a steady reduction in temperature of 6° C. per hour does not increase their melt viscosity and X-ray analysis shows that there is no crystallisation as a result of this heat treatment. Copolymers having molecular weights equivalent to a reduced viscosity (as measured in a 1% solution in dimethyl formamide at 25° C.) of 1.1 or more have very good surface hardness and flexural strength, are strong and are very suitable for moulding. They have full Vicat softening points which may be of the order of 170° C. or more. Below this molecular weight, the physical properties tend to drop off sharply.

The copolymers of maleic anhydride and 2-methyl pentene-1 alone are also transparent, generally colourless materials and have melt viscosities of the order of only 2–30 kilopoises. Thus, they may be moulded at temperatures as low as 200° C. (a range of from 200° C. to 220° C. being very suitable) to give shaped products which also have very good resistance to water; the increase in weight of 1 gm. samples 0.050±0.005 inch thick after immersion in boiling water for 120 minutes being only 0.6%. The materials are shown by X-ray analysis to be amorphous as formed and annealing the polymers from 230° C. at 6° C./hour does not increase their melt viscosity. X-ray analysis shows that there is no crystallinity as a result of this heat treatment. Copolymers of maleic anhydride and 2-methyl pentene-1 having molecular weights equivalent to a reduced viscosity of 0.7 or more have very good surface hardness and flexural strength, are strong, frequently transparent and are very suitable for moulding. They have full Vicat softening points generally of the order of 165° C. or more.

The physical properties of these copolymers may be modified as desired by the inclusion of other monomeric units in the polymeric chains as hereinbefore described.

Our copolymers are very useful as thermoplastic materials and are remarkably useful as materials for hot shaping processes such as extruding, injection and compression moulding and vacuum forming. Therefore, further according to the present invention we provide a process which comprises the steps of heating a high molecular weight copolymer of maleic anhydride, an alkene having the structure

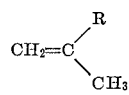

where R is a straight chain alkyl group containing from 2 to 6 carbon atoms and optionally at least one other monoethylenically unsaturated monomer, and containing at least 25% molar each of maleic anhydride and the alkene, until it attains a thermoplastic state, maintaining the said copolymer in a thermoplastic state while subjecting it to a shaping process and thereafter cooling the copolymer in shaped form.

It is preferred not to use copolymers of too high a molecular weight as they may become intractable.

Substantially water-insoluble copolymers having a water sensitivity corresponding to an increase in weight of less than 5% after immersion for 2 hours in boiling water are particularly attractive materials as they may be used for a number of purposes in which they are in a humid atmosphere for long periods.

Moulded products which may usefully be formed from our specified copolymers include such items as combs, penholders, handles for instruments, low stressed gears such as are used in small electrical motors and timing devices, rods, tubes, sheets, light fittings, bowls, dishes, telephone handsets, ash-trays, rubbish receptacles, boxes and the like.

Before shaping, the copolymers may be mixed with any of the usual additives such as plasticizers, heat and light stabilizers, mould release agents, lubricants and fillers such as talc, clay, carbon black, powdered metals, mica, asbestos, and glass fibre. The copolymers may also be blended with other polymeric materials, natural or synthetic.

The invention is illustrated by the following examples in which all parts are expressed as parts by weight except where otherwise indicated.

In all the following examples, the physical properties quoted were measured under the conditions set out below.

*Melt viscosity.*—Measured at 250° C. and a constant shear stress of $10^7$ dynes/cm.$^2$.

*Reduced viscosity.*—Measured on a 1% weight/volume solution of the copolymer in dimethyl formamide at 25° C. Reduced viscosity is defined by the equation $$R.V. = \frac{t_1 - t_0}{t_0 \cdot C}$$

where R.V. is the reduced viscosity, $t_0$ is the flow time of the solvent $t_1$ is the flow time of the solution, C is the concentration of the solution in grams per 100 cc.

*Vicat softening point.*—As described in British standard specification No. 2782, method 1020.

*Water sensitivity.*—A sheet weighing about 1 gm. and having a thickness of 0.050±0.005 inch was immersed in water at 100° C. for 2 hours and the change in weight of the sheet was measured at the end of that period and expressed as a percentage alteration in weight.

*Flexural strength.*—Measured by supporting a test piece moulded from the polymer at each end and pushing the centre of the piece downwards at a rate of 18 inches/minute as described in "Plastics," vol. 27, July 1962 at page 110.

*Energy to break.*—Measured on the same test as that used for flexural strength.

Example 1

A de-gassed solution of 9.24 parts of 2-methyl pentene-1, 9.8 parts of maleic anhydride and 0.098 part of acetyl cyclohexyl sulphonyl peroxide in 117 parts benzene was stirred for 48 hours at 35° C. under nitrogen. The precipitated polymer was removed by filtration and washed with benzene. Impurities were removed by continuous extraction with ether for 24 hours and the product was then dried for 24 hours at 100° C. and 0.3 mm. of mercury to give a yield of 17.1 parts of a polymer having a reduced viscosity of 0.60. X-ray examination showed the polymer to be amorphous both as made and after annealing from 230° C. Mouldings formed at 200–220° C. were colourless to amber in colour, transparent and strain free and had a full Vicat softening point of 153.5° C.

Example 2

The process of Example 1 was repeated using 7.7 parts of 2-methyl butene-1 instead of 2-methyl pentene-1. Upon separation, purification and drying, 12.8 parts of polymer having a reduced viscosity of 0.81 were obtained. The following table sets out the melt viscosities, the mole percent maleic anhydride and the water sensitivities of the polymers prepared in Examples 1 and 2.

TABLE I

| Example | Melt viscosity (poises×$10^3$) | Composition | Water sensitivity | | |
|---|---|---|---|---|---|
| | | | 30 | 60 | 120 |
| 1 | 11 | 51% maleic anhydride | 0.25 | 0.43 | 0.85 |
| 2 | 30 | 50% maleic anhydride | 0.10 | 0.20 | 0.40 |

Example 3

The process of Example 1 was repeated using a variety of solvents, concentrations of catalyst and polymerisation temperatures to show the effect of varying each of these on the molecular weight of the product. The results are set out in the following table.

TABLE II

| Catalyst concentration (Percent by weight of maleic anhydride) | Solvent | Temperature, ° C. | Yield in 72 hours (Percent) | Reduced viscosity |
|---|---|---|---|---|
| 0.14 | Benzene | 35 | 43 | 1.60 |
| 0.70 | do | 35 | 52 | 0.71 |
| 3.00 | do | 35 | 80 | 0.38 |
| 6.00 | do | 35 | 81 | 0.26 |
| 1.00 | do | 40 | 70 | 0.50 |
| 1.00 | do | 35 | 51 | 0.59 |
| 1.00 | do | 30 | 86 | 0.70 |
| 1.00 | Ether | 35 | 41 | 0.26 |
| 1.00 | Dioxane | 35 | 87 | 0.61 |
| 1.00 | Chlorobenzene | 35 | 48 | 0.79 |
| 1.00 | Acetone | 35 | 85 | 0.80 |
| 1.50 | Toluene | 35 | 36 | 0.45 |

Example 4

A number of copolymers of maleic anhydride and 2-methyl pentene-1 having varying molecular weights were prepared by the process of Example 1 and their melt viscosities, full Vicat softening points, flexural strengths and energies to break were compared. The results are displayed in Table III.

TABLE III

| Reduced viscosity | 10/10 Vicat, °C. | Melt viscosity (kilopoises) | Flexural strength, lb./sq. in. | Energy to break, ft. lb./cu. in. |
|---|---|---|---|---|
| 0.59 | 153.5 | 11 | 5,700 | 3 |
| 0.65 | | 4 | 10,700 | 10 |
| 0.67 | | | 11,300 | 11 |
| 0.71 | | 18 | 14,900 | 21 |
| 1.06 | 162.5 | 16 | 14,400 | 18 |
| 1.16 | 166 | 25 | 16,100 | 21 |

It may be seen that a substantial increase in strength (as shown by energy to break) and flexural strength occurs at a molecular weight equivalent to a reduced viscosity of about 0.7.

*Example 5*

The process of Example 2 was repeated using a variety of solvents, catalyst concentrations and polymerisation temperatures to show the effect of varying each of these on the molecular weight of the product.

TABLE IV

| Catalyst concentration (percent by weight of maleic anhydride) | Solvent | Temperature, °C. | Yield, percent | Reduced viscosity |
|---|---|---|---|---|
| 1.0 | Benzene | 35 | 72 | 1.08 |
| 1.0 | Toluene | 35 | 80 | 0.69 |
| 1.5 | Benzene | 35 | 68 | 0.81 |
| 1.0* | do | 40 | 70 | 2.20 |

*The catalyst was $\alpha\alpha'$-azodiisobutyronitrile.

*Example 6*

A number of copolymers of maleic anhydride and 2-methyl butene-1 having varying molecular weights were prepared by the process of Example 2 and their melt viscosities, full Vicat softening points, flexural strengths and energies to break were compared. The results are compared in the table below.

TABLE V

| Reduced viscosity | 10/10 Vicat, °C. | Melt viscosity (kilopoises) | Flexural strength, lb./sq. in. | Energy to break, ft. lb./cu. in. |
|---|---|---|---|---|
| 0.52 | 158.5 | 16 | 6,900 | 2 |
| 0.69 | | 19 | 9,300 | 7 |
| 1.08 | 171 | 30 | 12,000 | 11 |
| 1.16 | | 50 | 15,800 | 21 |
| 1.42 | 171 | 40 | 18,900 | 26 |
| 2.20 | 173 | | 18,900 | 25 |

It may be seen that a substantial increase in strength (as shown by energy to break) and flexural strength occurs at a molecular weight equivalent to a reduced viscosity of about 1.1.

*Example 7*

A de-gassed solution of 9.8 parts of maleic anhydride, 13.9 parts of 2-methyl octene-1 and 0.098 part of acetyl cyclohexyl sulphonyl peroxide in 117 parts of benzene was stirred for 48 hours at 35° C. under nitrogen. The precipitated solid was extracted and washed and the product was purified and dried after the manner described in Example 1 to give the copolymer in the form of a powder that could be moulded to give clear, transparent mouldings.

*Example 8*

Using the process of Example 1, maleic anhydride, 2-methyl pentene-1 and varying amounts of diethyl fumarate were polymerised using azo-di-isobutyronitrile as catalyst at 40° C. The polymerisation conditions and results are set out in Table VI.

TABLE VI

| Experiment | A | B | C | D | E | F |
|---|---|---|---|---|---|---|
| Maleic anhydride, parts | 5.0 | 5.0 | 4.4 | 4.4 | 5.0 | 2.5 |
| 2-methyl pentene-1, parts | 4.2 | 5.4 | 5.4 | 5.4 | 5.4 | 5.4 |
| Diethyl fumarate, parts | 0 | 2.2 | 3.25 | 3.25 | 2.2 | 6.6 |
| Catalyst, part | 0.025 | 0.054 | 0.054 | 0.027 | 0.027 | 0.054 |
| Yield percent | 70 | 45 | 83 | 100 | 60 | 19 |
| Reduced viscosity | 1.40 | 1.01 | 0.94 | 0.97 | 1.00 | 0.62 |
| Vicat Softening Point (° C.) | 169.5 | 166.5 | 163.5 | 157.0 | 151.0 | 157.0 |
| Diethyl fumarate in product* (wt. percent) | 0 | 1.58 | 1.9 | 2.3 | 2.7 | 3.4 |

*Calculated by analysis of ethoxyl groups in the copolymer.

Similar results may be obtained using other dialkyl fumarates such as dimethyl fumarate, di-n-butyl fumarate and di-2-ethyl hexyl fumarate.

*Example 9*

The polymer of Example 8F, which was amorphous as obtained from the polymerisation, was annealed from 230° C. at 6° C. per hour. No detectable crystallinity developed.

A sheet of the polymer, weighing about 1 gm. and having a thickness of 0.05±0.005 inch was immersed in water at 100° C. for 2 hours at the end of which time it was found to have gained only 0.6% in weight.

*Example 10*

The process of Example 8 was repeated using di-n-butyl maleate as the third component and the polymerisation details and results are set out below.

TABLE VII

| Experiment | G | H | J | K | L |
|---|---|---|---|---|---|
| Maleic anhydride, parts | 5.0 | 5.0 | 4.4 | 3.8 | 1.9 |
| 2-methyl pentene-1, parts | 4.2 | 5.4 | 5.4 | 5.4 | 5.9 |
| Di-n-butyl maleate, parts | 0 | 10.2 | 15.0 | 20.4 | 22.9 |
| Catalyst, part | 0.025 | 0.054 | 0.054 | 0.054 | 0.041 |
| Yield, percent | 80 | 87 | 91 | 90 | 70 |
| Reduced viscosity | 1.36 | 1.12 | 1.20 | 1.49 | 0.63 |
| Vicat Softening Point (° C.) | 167 | 167 | 164.5 | 161.5 | 155.5 |
| Di-n-butyl maleate in product* (wt. percent) | 0 | 0 | 0.8 | 0.9 | 1.6 |

*Calculated by analysis of the n-butoxyl groups in the copolymer.

Similar results may be obtained using other dialkyl maleates such as dimethyl maleate, di-ethyl maleate and di-n-amyl maleate.

*Example 11*

Using the process of Example 2, maleic anhydride, 2-methyl butene-1 and varying amounts of methyl methacrylate were polymerised together using $\alpha\alpha'$-azodiisobutyronitrile as catalyst and a temperature of 40° C. Polymerisation details and results are set out below.

TABLE VIII

| Experiment | M | N | O | P | R | S[1] |
|---|---|---|---|---|---|---|
| Maleic anhydride, parts | 5.0 | 4.41 | 3.92 | 3.43 | 2.44 | 100 |
| 2-methyl butene-1, parts | 5.4 | 3.5 | 3.5 | 3.5 | 3.5 | 102 |
| Methyl methacrylate, parts | 0 | 0.49 | 0.81 | 1.49 | 2.0 | 43 |
| Catalyst, part | 0.05 | 0.035 | 0.035 | 0.035 | 0.035 | 0.5 |
| Yield percent | 57 | 82 | 72 | 72 | 55 | 33 |
| Reduced viscosity | 1.42 | 2.25 | 2.15 | 2.33 | 2.66 | 0.95 |
| Vicat softening point (° C.) | 171.0 | 153.0 | 151.5 | 142.0 | 135.0 | 153.5 |
| Maleic anhydride in product (mole percent) | 50 | 49.4 | 48.9 | 39.25 | 37.5 | 46.4 |
| 2-methyl butene-1 (mole percent) | 50 | 44.9 | 39.7 | 38.0 | 32.5 | 24.6 |
| Methyl methacrylate (mole percent) | 0 | 6.7 | 11.4 | 22.8 | 30.0 | 29.0 |

[1] In this experiment, acetyl cyclohexyl sulphonyl peroxide was used in place of $\alpha\alpha'$-azodiisobutyronitrile and the catalyst had the effect of directing the mode of introduction of the methyl methacrylate units so that they favored substitution of the alkene groups rather than the maleic anhydride groups. The polymer had a melt viscosity of 20 kilopoises.

*Example 12*

A sheet of the polymer of Example 11S, weighing about 1 gm. and having a thickness of 0.050±0.005 inch, was immersed in boiling water for 2 hours. At the end of this period it was found to have gained 0.77% in weight but was otherwise unaffected.

*Example 13*

A mixture of 196 parts of maleic anhydride, 119 parts of 2-methyl butene-1, 0.5 part of acetyl cyclohexyl sulphonyl peroxide and 1760 parts of dry benzene was charged into a polymerisation vessel which was then purged with nitrogen. 28 parts of isobutene were then added to the mixture and the whole was heated with stirring at 35° C. for 23 hours. The precipitated polymer was removed by filtration, washed with benzene and continuously extracted with ether for 24 hours to remove impurities. The pure product was then dried at 100° C. and 0.07 mm. of mercury for 24 hours to give 220 parts of a polymer having a reduced viscosity of 1.37.

The polymer was found to have a melt viscosity of 100 kilopoises and a ful Vicat softening point of 169° C. A sheet weighing 1 gm. and having a thickness of 0.050±0.005 inch was found to gain only 0.58% in weight after immersion in boiling water for 2 hours and was otherwise unchanged.

Comparison of the infra-red spectrum of the polymer with that of a copolymer of maleic anhydride and 2-methyl butene-1 and that of a copolymer of maleic anhydride and isobutene showed that the copolymer contained 11.7 mole percent of isobutene and 38.3 mole percent of 2-methyl butene-1.

The polymer was compression moulded at 235° C. for 2 minutes to give a strong clear colourless moulding.

*Example 14*

A de-gassed solution of 78.4 parts of maleic anhydride, 77 parts of 2-methyl butene-1, 34.6 parts of N-phenyl maleimide and 0.25 part of azo-diisobutyronitrile in 1320 parts of benzene was stirred for 23 hours at 59–60° C. under nitrogen. The precipitated product was ground into small particles, extracted with ether and dried by the procedure described in Example 12 to yield 46 parts of a polymer having a reduced viscosity of 0.83 and a full Vicat softening point of 171.5° C.

The polymer was found to have a melt viscosity of 110 kilopoises and a sheet weighing 1 gm. and having a thickness of 0.050±0.005 inch gained 0.70% in weight after immersion in boiling water for 2 hours. The sheet was otherwise unaffected by the immersion.

Nitrogen analysis showed that the polymer contained 5.5 mole percent of N-phenyl maleimide.

The polymer was compression moulded at 235° C. for 2 minutes to a strong clear pale yellow moulding.

Example 15

A mixture of 196 parts of maleic anhydride, 142 parts of 2-methyl pentene-1, 0.5 part of acetyl cyclohexyl sulphonyl peroxide and 1760 parts of dry benzene was charged into a polymerisation vessel which was then purged with nitrogen. 28 parts of isobutene were then added to the mixture and the whole was heated with stirring at 40° C. for 24 hours.

The precipitate was separated by filtration and worked up in the manner described in Example 12 to give a yield of 210 parts of a polymer having a reduced viscosity of 1.23 and a full Vicat softening point of 168° C.

The polymer was found to have a melt viscosity of 40 kilopoises and a sheet weighing 1 gm. and having a thickness of 0.050±0.005 inch gained 0.73% in weight after immersion in boiling water for 2 hours. The sheet was otherwise unaffected by the immersion.

Comparison of the infra-red spectrum of the polymer with that of a copolymer of maleic anhydride and 2-methyl pentene-1 and that of a copolymer of maleic anhydride and isobutene showed that the copolymer contained 17.3 mole percent of isobutene and 32.7 mole percent of 2-methyl pentene-1.

The polymer was compression moulded at 235° C. for 2 minutes to give a clear colourless and strong moulding.

Example 16

A de-gassed solution of 78.4 parts of maleic anhydride, 92.3 parts of 2-methyl pentene-1, 34.6 parts of N-phenyl maleimide and 0.4 part of azo-diisobutyronitrile in 1320 parts of benzene was stirred for 21 hours at 59–60° C. under nitrogen. The precipitate was filtered and worked up in the manner described in Example 12 to give 61 parts of a polymer having a reduced viscosity of 0.93 and a full Vicat softening point at 178° C.

The polymer was found to have a melt viscosity of 13 kilopoises and a sheet weighing 1 gm. and having a thickness of 0.050±0.005 inch gained 0.86% in weight after immersion in boiling water for 2 hours. The sheet was otherwise unaffected by the immersion.

Nitrogen analysis showed that the polymer contained 7 mole percent of N-phenyl maleimide.

The polymer was compression moulded at 235° C. for 2 minutes to give a strong clear amber moulding.

We claim:

1. A moldable copolymer consisting of substantially equimolar proportions of maleic anhydride and an alkene of the structure

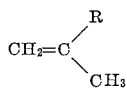

where R is a straight chain alkyl group containing from 2 to 6 carbon atoms.

2. A moldable copolymer according to claim 1 in which the alkene is selected from the group consisting of 2-methyl butene-1 and 2-methyl pentene-1.

3. A moldable copolymer of 25% to 50% molar of maleic anhydride, 25% molar of an alkene of the structure

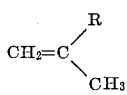

where R is a straight chain alkyl group containing from 2 to 6 carbon atoms, and up to 25% molar of at least one other mono-ethylenically unsaturated compound.

4. A moldable copolymer according to claim 3 in which the alkene is selected from the group consisting of 2-methyl butene-1 and 2-methyl pentene-1.

5. A moldable copolymer according to claim 3 in which the mono-ethylenically unsaturated compound is an ester of an acrylic acid.

6. A moldable copolymer according to claim 5 in which the mono-ethylenically unsaturated compound is methyl methacrylate.

7. A moldable copolymer according to claim 3 in which the mono-ethylenically unsaturated compound is a dialkyl ester of an ethylenically unsaturated dicarboxylic acid.

8. A moldable copolymer according to claim 7 in which the mono-ethylenically unsaturated compound is a dialkyl fumarate.

9. A moldable copolymer according to claim 8 in which the mono-ethylenically unsaturated compound is diethyl fumarate.

10. A moldable copolymer according to claim 7 in which the mono-ethylenically unsaturated compound is a dialkyl maleate.

11. A moldable copolymer according to claim 10 in which the mono-ethylenically unsaturated compound is di-n-butyl maleate.

12. A moldable copolymer according to claim 3 in which the mono-ethylenically unsaturated compound is a cyclic derivative of an αβ-ethylenically unsaturated dicarboxylic acid.

13. A moldable copolymer according to claim 12 in which the mono-ethylenically unsaturated compound is an N-substituted maleimide.

14. A moldable copolymer according to claim 13 in which the mono-ethylenically unsaturated compound is N-phenyl maleimide.

15. A moldable copolymer according to claim 3 in which the mono-ethylenically unsaturated compound is another alkene and has the structure

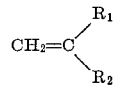

where $R_1$ and $R_2$ are alkyl groups, and which has a chain of not more than 6 carbon atoms.

16. A moldable copolymer according to claim 3 in which the mono-ethylenically unsaturated compound is isobutene.

17. A moldable copolymer consisting of essentially equimolar proportions of maleic anhydride and 2-methyl butene-1 having a reduced viscosity of at least 1.1, measured as a 1% weight/volume solution in dimethyl formamide at 25° C.

18. A moldable copolymer consisting of essentially equimolar proportions of maleic anhydride and 2-methyl pentene-1 having a reduced viscosity of at least 0.7, measured as a 1% weight/volume solution in dimethyl formamide at 25° C.

19. A moldable copolymer according to claim 1 which in the form of a sheet weighing about 1 gm. and having a thickness of 0.050±0.005 inch gains not more than 5% in weight after immersion in boiling water for 2 hours.

20. A moldable copolymer according to claim 19 having a full Vicat softening point of at least 150° C.

21. A moldable copolymer of maleic anhydride and 2-methyl octene-1 in substantially equimolar proportions.

22. A moldable copolymer of 25–50% molar of maleic anhydride, at least 25% molar of 2-methyl pentene-1 and up to 25% molar di-n-butyl maleate.

23. A moldable copolymer of 25–50% molar of maleic anhydride, at least 25% molar of 2-methyl pentene-1 and up to 25% molar isobutene.

24. A moldable copolymer of 25–50% molar of maleic anhydride, at least 25% molar of 2-methyl pentene-1 and up to 25% molar N-phenyl maleimide.

25. A moldable copolymer of 25–50% molar of maleic anhydride, at least 25% molar of 2-methyl butene-1 and up to 25% molar methyl methacrylate.

26. A moldable copolymer of 25–50% molar of maleic anhydride, at least 25% molar of 2-methyl butene-1 and up to 25% molar isobutene.

27. A moldable copolymer of 25–50% molar of maleic anhydride, at least 25% molar of 2-methyl butene-1 and up to 25% molar N-phenyl maleimide.

(References on following page)

References Cited by the Examiner

UNITED STATES PATENTS

| | | | |
|---|---|---|---|
| 2,378,629 | 6/1945 | Hanford | 260—48.5 |
| 2,411,599 | 11/1946 | Sparks | 260—86.7 |
| 2,857,365 | 10/1958 | Johnson | 260—78.5 |
| 3,048,487 | 8/1962 | Minsk et al. | 260—78.5 |

FOREIGN PATENTS 501,669   3/1939   Great Britain.

JOSEPH L. SCHOFER, *Primary Examiner.*

J. KIGHT, L. WOLF, *Assistant Examiners.*